United States Patent [19]

Kanamaru

[11] Patent Number: 4,491,877
[45] Date of Patent: Jan. 1, 1985

[54] CROSS-TALK DETECTOR IN INFORMATION-CARRYING DISC PLAYER

[75] Inventor: Hitoshi Kanamaru, Tokorozawa, Japan

[73] Assignee: Pioneer Video Corporation, Tokyo, Japan

[21] Appl. No.: 376,034

[22] Filed: May 7, 1982

[30] Foreign Application Priority Data

May 9, 1981 [JP] Japan .................................. 56-070029
May 9, 1981 [JP] Japan .................................. 56-070030

[51] Int. Cl.³ .............................................. H04N 5/76
[52] U.S. Cl. ..................................... 358/336; 358/342
[58] Field of Search ............... 358/328, 340, 342, 327, 358/336; 369/44, 45, 46, 111, 61, 62, 100, 124

[56] References Cited

U.S. PATENT DOCUMENTS 4,310,912  1/1982  Kikuchi et al. ...................... 369/45
4,322,746  3/1982  Oguino ................................ 358/340

Primary Examiner—Donald E. McElheny, Jr.
Attorney, Agent, or Firm—Fleit, Jacobson, Cohn & Price

[57] ABSTRACT

A cross-talk detecting device to be incorporated in an information-carrying disc player for detecting an error component appearing within a preselected or predetermined constant frequency period at which the modulating signal has a certain constant frequency corresponding to, for example, a gray level in a video signal.

6 Claims, 15 Drawing Figures

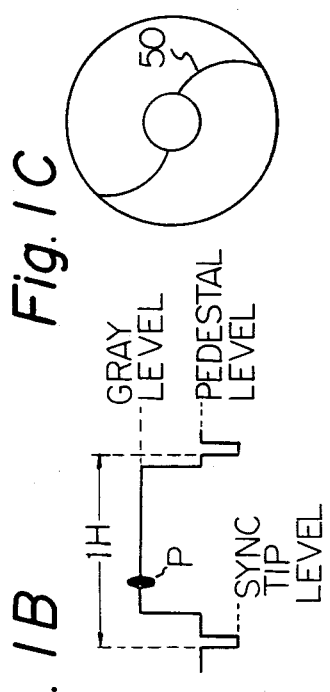
Fig. IA
Fig. IB
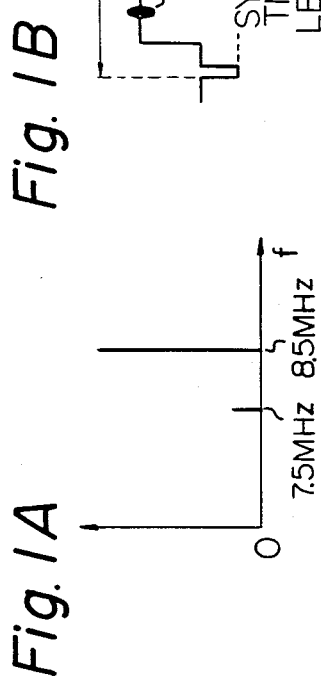
Fig. IC
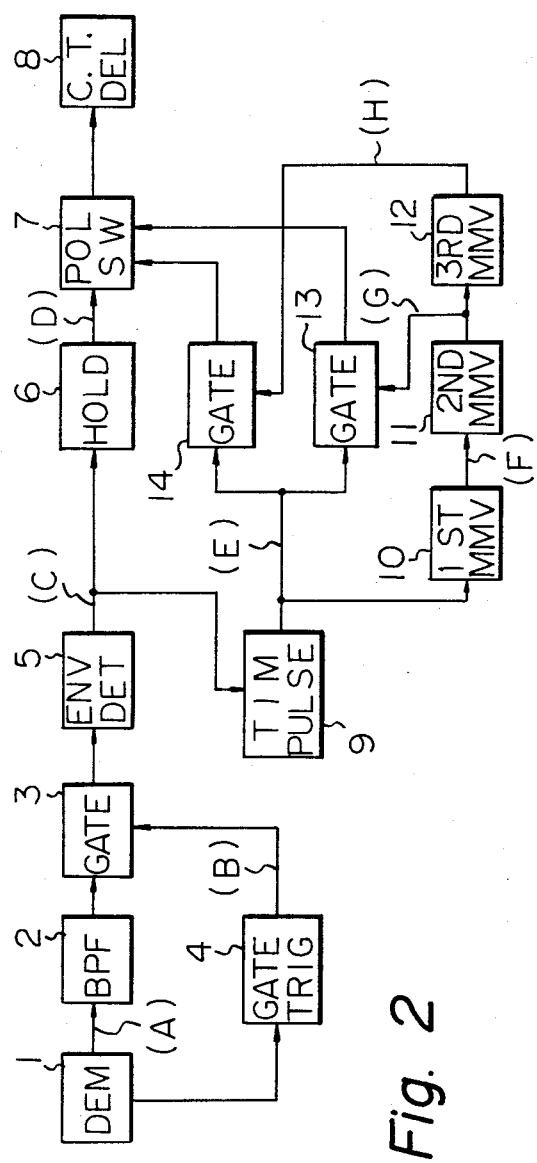
Fig. 2

CROSS-TALK DETECTOR IN INFORMATION-CARRYING DISC PLAYER

FIELD OF THE INVENTION

The present invention relates to an information-carrying disc player and, in particular, to a cross-talk detector in the information-carrying disc player.

BACKGROUND OF THE INVENTION

It is generally a problem in an information-carrying disc player that information read from a target track on an information-carrying disc contains some components affected by information recorded on a neighbouring track, which is so-called cross-talk phenomenon.

It is well known that, in an optical information-carrying disc player, aberration in a reading optical pick-up system, deviation of the optical axis of a reading spot from the rotation axis of the information-carrying disc, etc. causes distortion in configuration of the pickup spot take place on the recording surface of the disc, which distortion causes such cross-talk phenomenon as mentioned above.

The above-mentioned deviation of the optical axis of a reading spot with respect to the rotation axis of the disc may be caused by, for example, deformation either of the information carrying disc to be played or of the chassis supporting the turn-table spindle. Such deformation occurs during usage by users, so that a cross-talk detecting device should be provided or equipped with an information-carrying disc player in addition to the usual tracking and focusing servo systems.

SUMMARY OF THE INVENTION

It is accordingly a primary object of the present invention to provide a cross-talk detecting device to be incorporated in an information-carrying disc player, which device produces a cross-talk detection signal representing an amount of cross-talk error.

It is another object of the present invention to provide a cross-talk detecting device which can produce a cross-talk detection signal representative both of the amount and direction of the cross-talk.

BRIEF DESCRIPTION OF THE DRAWINGS

The features and advantages of a cross-talk detecting device according to the present invention will be more clearly understood from the following description taken in conjunction with the accompanying drawings, in which:

FIG. 1A is a frequency spectrum of a signal demodulated from a modulated carrier signal obtained from a portion of a track on an information-carrying disc;

FIG. 1B is a diagram showing a waveform of a video signal having such frequency spectrum shown in FIG. 1A;

FIG. 1C is a sketch of an information-carrying disc on which information is recorded in the form of one or more tracks at a varying angular velocity such as constant line velocity (CLV);

FIG. 2 is a block diagram showing a cross-talk detecting device according to the present invention;

DESCRIPTION OF THE EMBODIMENT

Figure 3:
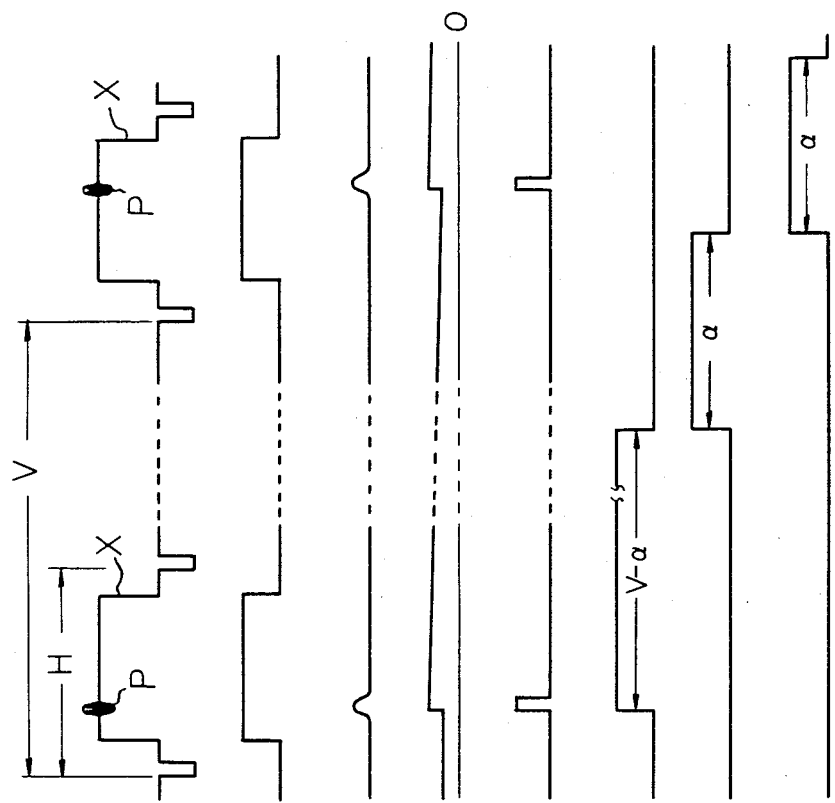
FIGS. 3A through 3H are diagrams respectively showing waveforms of signals appearing in the device shown in FIG. 2.

Referring to the drawings, especially to FIG. 1A, there is shown a frequency spectrum of a recorded signal which is a modulated carrier signal having a central frequency of 8.5 MHz. The modulated carrier signal may be read by means of a pick-up device (not shown) from a target track on an information-carrying disc (not shown) which is rotated in a suitable manner by a turn-table (not shown). In this case, the picked-up signal further contains another frequency signal due to a 7.5 MHz signal which is introduced from another track neighbouring to the target track. The frequency component of 7.5 MHz introduced from the neighbouring track causes a beat component of a frequency of 1 MHz which corresponds to a cross-talk component appearing in a demodulated signal from the picked-up or read carrier signals.

If, in this instance, the read carrier signal is modulated in frequency by a composite video signal to be reproduced on a two-dimensional displayer such as braun tube, the carrier signal has a frequency of 8.5 MHz corresponding to a gray level and a frequency of 7.5 MHz corresponding to the so-called sync tip level. FIG. 1B shows a single H (horizontal) line period of the composite video signal containing a video information portion representative of a gray picture and two consecutive H sync pulses defining therebetween the video information portion. Since, in this instance, the picked-up signal contains not only the frequency signal of 8.5 MHz but also the signal at 7.5 MHz, the demodulated composite signal contains a cross-talk or error component within the video information portion as indicated by a reference character P in FIG. 1B.

Such cross-talk phenomenon mentioned above, takes place when the composite video signal carried on the video carrier signal is read from a non-CAV video disc which is to be rotated at a speed uniformly continuously varied in accordance with the position of the reading spot of the detecting point, such as, a CLV video disc in which the 1-H periods corresponding to each other appearing in the respective field periods locates on curved lines 50 shown in FIG. 1C. It can be said that the cross-talk component P is FIG. 1B appearing in the video information portion is caused by the H sync pulse of the neighbouring track. In view of the above-mentioned phenomenon, the Applicant conceived that the cross-talk component may be readily detected only when the video information has a certain constant level such as the gray level. It is now to be noted that the video information portion of several H periods appearing within the vertical blanking period in the composite video signal respectively have a constant gray levels. Therefore, according to the present invention, the cross-talk component in the picked-up information signal such as a composite video signal is detected by separating in frequency the cross-talk component from the carrier signal during predetermined constant frequency sections at which the modulating signal has a certain constant frequency corresponding to a certain level such as the gray level. The constant frequency sectional periods are, for example, several H periods during the vertical blanking periods in the usual composite video signal. Another example of the constant frequency sectional period is a VIRS (vertical interval reference signal) period in another type of video information signal.

In FIG. 2, there is shown a cross-talk detecting device according to the present invention which comprises a demodulator 1 which demodulates a modulated carrier signal read by means of a pick-up means (not shown) from an information-carrying disc (not shown) played in an information-carrying disc player. The demodulated signal (A) which is, for example, a usual composite video signal is applied to a band pass filter 2 which separates in frequency a cross-talk component from the composite video signal. The cross-talk component corresponds to a beat frequency between one modulated carrier signal recorded on a target track and the other modulated carrier signal recorded on a neighbouring track. The output signal from the band pass filter 2 is applied to a gate circuit 3 which is triggered to be open by a gate trigger signal (B) from a gate trigger signal generator 4. The gate trigger signal generator 4 may be arranged to count the number of H sync pulses from the beginning of the vertical blanking period and to produce the gate trigger signal appearing at a preselected H-period within the vertical blanking period, the preselected H-period being the above-mentioned constant frequency sectional period. Since, as mentioned above, the gate circuit 3 is open during the constant frequency sectional period, the output signal from the gate circuit 3 contains only the cross-talk component which corresponds to the above-mentioned beat frequency in the modulated carrier signal. The cross-talk component from the gate circuit 3 is applied to an envelope detector 5 which produces an envelope signal of the cross-talk component. The envelope signal may be utilized for eliminating the cross-talk component by adding a signal having a waveform reverse in phase to the cross-talk component to the demodulated signal (A). The envelope signal is applied to a hold circuit 6 which holds the peak level of the envelope signal (C) until appearance of the succeeding cross-talk component within the succeeding constant frequency period. The output signal (D) from the hold circuit 6 represents the magnitude or amount of the cross-talk component. The output signal from the hold circuit 6, which is a cross-talk amount signal, is applied to a polarity switching circuit 7. The polarity switching circuit 7 is adapted to produce a polarized cross-talk signal having a polarity of either plus or minus according to cross-talk direction signals applied thereto. The polarized cross-talk signal is applied to a cross-talk eliminating system 8 which adjusts the mechanical relation between various elements of the disc player so as to eliminate the cross-talk.

The envelope signal (C) is further applied to a timing pulse generator 9 which produces a timing pulse (E) in response to the envelope signal (C). The timing pulse represents the appearance of the cross-talk component. The timing pulse (E) is applied to a trigger terminal of a first monostable multivibrator 10 which produces a pulse signal lasting during a predetermined time period. The pulse signal from the first monostable multivibrator 10 causes second and third monostable multivibrators 11 and 12, which are connected to each other in cascade, to be triggered thereby to produce the respective pulse signals (G, H) having the same pulse width as each other. The pulse signals (G, H) are respectively applied to two gate circuits 13 and 14 which pass therethrough the timing pulse (E) when triggered by the respective pulse signals (G, H). The output signals from the gate circuits 13 and 14 are applied to the polarity switching circuit 7 as the cross-talk direction signals.

The operation of the above-mentioned cross-talk detecting device of FIG. 2 will be explained in more detail while referring to FIGS. 3A through 3H.

When the demodulated signal (A) produced from the demodulator 1 is a composite video signal, the demodulated signal (A) contains a vertical period V corresponding to a single "field" and constituted by a plurality of H periods as shown in FIG. 3A. One of the H periods within the vertical blanking period is selected to be the constant frequency sectional period which is indicated by X in FIG. 3A. Every vertical blanking period may contain a single constant frequency sectional period but, in some cases, may contain several ones if preferred. Furthermore, only alternate vertical blanking periods may contain the constant frequency sectional periods. As being shown in FIG. 3A, the constant frequency period X contains the cross-talk component P. Since the gate circuit 3 is triggered by the gate trigger signal having such a waveform as shown in FIG. 3B, the envelope detector 5 produces envelope signal having such a waveform as shown in FIG. 3C. The peak level of the envelope signal is held by the hold circuit 6 which produces the output signal (D) having such a waveform as shown in FIG. 3D. On the other hand, the timing pulse generator 9 produces the timing pulse (E) having such a waveform as shown in FIG. 3E. Thus, the first monostable multivibrator 10 produces the pulse signal (F) having such a pulse width of V-α as shown in FIG. 3F. The period α is preferably selected to be generally or approximately equal to 1-H time period. The second monostable multivibrator 11 is triggered at the trailing edge of the pulse signal (F) so as to produce the pulse signal (G) having a pulse width of α as shown in FIG. 3G. The third monostable multivibrator 12 is triggered at the trailing edge of the pulse signal (G) so as to produce the pulse signal (H) having a pulse width of α as shown in FIG. 3H. These pulse signal (G) and (H) are respectively applied to the gate circuits 13 and 14 either one of which passes therethrough the timing pulse signal (E) in response to the pulse signal (G) and (H).

The timing pulse generator 9, the first through third monostable multivibrator 10 through 12 and gate circuits 13 and 14 cooperate with each other as a cross-talk direction detecting circuit which compares a time period between the two consective timing pulse signal (E) with the repetition period of the constant frequency sectional periods, which is equal to a single vertical period V, so as to produce the cross-talk direction signal indicating the cross-talk direction, that is, from inside track to outside track or vice versa. It is to be noted that the term "cross-talk direction" is used in this specification for expressing a radial direction in which there exists a track neighbouring to the target track and carrying thereon information causing the appearance of the cross-talk component, that is, an error component.

The reason why the above-mentioned cross-talk direction detecting circuit can detect the cross-talk direction in which the cross-talk takes place will be explained hereinbelow.

When cross-talk phenomenon takes place during reproduction of the non-CAV disc such as the CLV disc or such a disc as shown in FIG. 1C, such cross-talk as shown in FIG. 1B takes place, in which cross talk component corresponding to the H sync pulse in the neighbouring track appears in the constant frequency H period. As seen from FIG. 1C, the relative position of two adjacent H period on the neighbouring tracks offset from each other in the radial direction of the disc. Therefore, a time period from one cross-talk component in one constant frequency H period to another cross-talk component in another constant frequency H period succeeding to the one constant frequency H period is longer or shorter than the repetition period of the constant frequency H periods in accordance with the direction of the cross-talk. It is therefore possible to detect the cross-talk direction by comparing the time period between the two consecutive cross-talk components with the repetition period of the constant frequency sectional periods.

Figure 4:
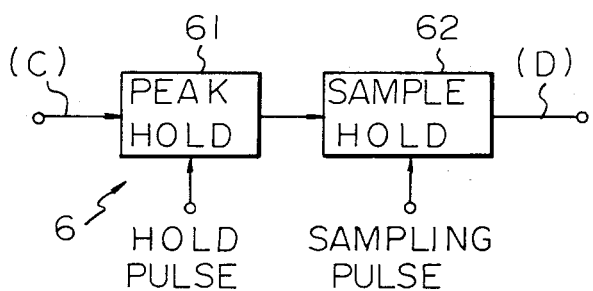
FIG. 4 is a block diagram showing an example of a part of the device shown in FIG. 2.

In FIG. 4, there is shown a circuit arrangement of the hold circuit 6 of FIG. 2. The hold circuit 6 shown in FIG. 4 includes a peak hold circuit 61 which holds peak level of the envelope signal (C) during appearance of a hold pulse. The output signal from the peak hold circuit is sampled by a sample hold circuit 62 during appearance of a sampling pulse. The peak hold circuit 61 is adapted to be reset at the trailing edge of each hold pulse thereby to prepare to hold the next envelope signal. The sampling pulse can be obtained by wave-shaping the envelope signal (C) and the sample hold circuit 62 is triggered by the trailing edge of the sampling pulse thereby to renew the output signal (D). The sample hold circuit 62 is adapted to discharge the sampled peak level at a predetermined time constant thereby to cease to produce the output signal (D) after the lapse of a predetermined time period from the appearance of the cross-talk component.

It is to be understood that the H sync pulse period may be selected as the above-mentioned constant frequency sectional periods. In this case, the luminous information component on the neighbouring track which has entered into the H sync pulse period is detected as the cross-talk component. This method for detecting the cross-talk component within the H sync pulse period can provide more precise detection of the cross-talk. However, it is difficult to detect the timing of appearance of the cross-talk component and therefore to detect the cross-talk direction. Another cross-talk direction detecting device other than the cross-talk detection circuit mentioned in FIG. 2 may be required in the method in which the H sync pulse period is used for the constant frequency period.

Figure 5A:
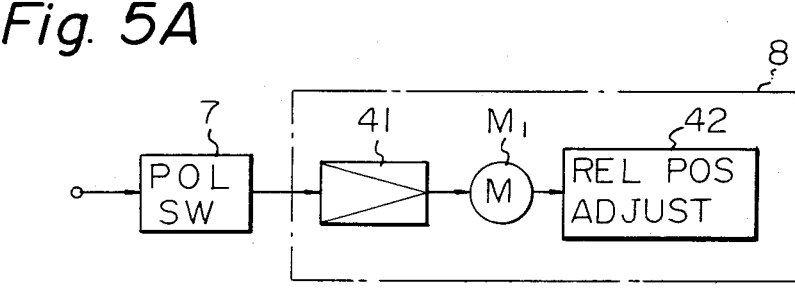
FIGS. 5A and 5B are block diagrams respectively showing examples of cross-talk deleting devices utilizing the cross-talk detecting device according to the present invention.
Figure 5B:
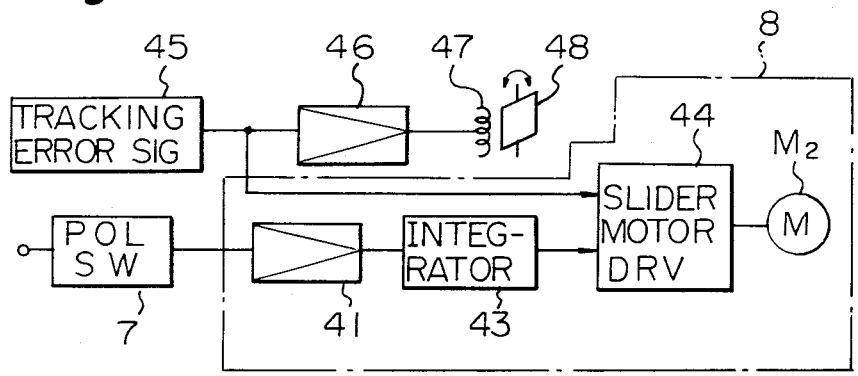

In FIGS. 5A and 5B, there is shown examples of the cross-talk eliminating system 8 in the circuit of FIG. 2.

In FIG. 5A, the polarized cross-talk signal produced from the polarity switching circuit 7 is amplified by an amplifier 41. The output signal from the amplifier 41 is supplied to a servo motor $M_1$ which drives a relative position adjust mechanism 42. The relative position adjust mechanism 42 is adapted to adjust the relative angular position of the pick-up device with respect to the recording surface of the information-carrying disc on the turn table thereby to delete the cross-talk. The relative position adjust mechanism may regulate the optical axis of a pick-up beam emitted from an optical pick-up device. Otherwise, the relative position adjust mechanism may regulate the inclination of the turntable.

In FIG. 5B, the polarized cross-talk signal from the polarity switching circuit 7 is amplified by an amplifier 41 and then integrated by an integrator 43. The amplified and integrated cross-talk signal is applied to a slider motor driver 44 which drives a slider servo motor $M_2$. The slider servo motor $M_2$ is adapted to move a pick-up carrier (not shown) supporting thereon a pick-up device (not shown) in the radial direction of the turntable. As is well known known in the art, the slider servo motor is regularly controlled by a tracking error signal obtained from a tracking error signal generator 45. Thus, the slider servo motor $M_2$ is driven by the tracking error signal and the polarized cross-talk signal superposed on each other. As being well known, the tracking error signal is amplified by an amplifier 46 and supplied to a mirror drive coil 47 for regulating the position of the tracking mirror 48 in the case of an optical pick-up system.

It is to be understood that the cross-talk detecting device can be utilized as a tracking error detector in an information-carrying disc player of an electrostatic type.

What is claimed is:

1. In an information-carrying disc player for reading a carrier signal recorded on an information-carrying disc in the form of one or more spiral or angular tracks while centering a detecting point on a target track and rotating said disc at an angular velocity uniformly continuously variable with the radial position of said detecting point on the recording surface of the disc, said carrier signal being modulated in frequency by a video modulating signal containing successively appearing constant frequency sections at which the frequency thereof is constant, the improvement which comprises:
   demodulating means for demodulating the read carrier signal into said video modulating signal;
   filter means for passing therethrough an error component having a frequency within a predetermined frequency range;
   gate trigger signal generating means for producing a gate trigger signal during each of said constant frequency sections;
   gate means for opening its gate in response to said gate trigger signal so as to pass therethrough said error component; and
   signal producing means for producing an error signal representative of the magnitude of said error component.

2. The information-carrying disc player as defined in claim 1, in which said signal producing means includes an envelope detector for detecting an envelope in said error component so as to produce an envelope signal as said error signal.

3. The information-carrying disc player as defined by claim 1, in which said modulating signal is a video signal to be reproduced on a two dimensional displayer, and said constant frequency periods are contained in all or selected ones of the vertical blanking periods.

4. The information-carrying disc player as defined by claim 1, in which said modulating signal is a video signal to be reproduced on a two dimensional displayer, and said constant frequency periods are contained in all or selected ones of the horizontal blanking periods.

5. The information-carrying disc player as defined in claim 1, in which said constant frequency sections appear periodically with a certain repetition period, and which further comprises:
   error direction detecting means connected to said signal producing means, for producing an error direction signal representative of a radial direction in which there exists a track neighbouring to said target track and carrying information causing the appearance of said error component.

6. The information-carrying disc player as defined in claim 5, in which said error direction detecting means includes:
- a timing pulse generator coupled to said signal producing means, for generating a timing pulse each time said error component appears;
- a first gate trigger pulse generator coupled to said timing pulse generator, for generating a first gate trigger pulse lasting from the appearance of said timing pulse to a time period substantially equal to said repetition period;
- a second gate trigger pulse generator coupled to said first gate trigger pulse generator, for generating a second gate trigger pulse during a time period equal to generally one-half of a time period during which each of said constant frequency sections lasts;
- a first gate means receiving and passing therethrough said timing pulse as a first polarity command signal in response to said first gate trigger pulse;
- a second gate means receiving and passing therethrough said timing pulse as a second polarity command signal in response to said second gate trigger pulse;
- a hold circuit means receiving and holding a peak level of said error component; and
- a polarity switching circuit means receiving said error signal and producing a polarized error signal having a magnitude corresponding to the magnitude of said error component and either one of plus and minus polarities in accordance with said first and second polarity command signals.

* * * * *